United States Patent [19]
Shaler et al.

[11] 3,787,889
[45] Jan. 22, 1974

[54] FACSIMILE RECORDER WITH GUIDED STYLI

[75] Inventors: David Shaler, Madison; John H. Long, Oakland, both of N.J.

[73] Assignee: Muirhead, Inc., Mountainside, N.J.

[22] Filed: Feb. 5, 1973

[21] Appl. No.: 329,575

[52] U.S. Cl. .............................. 346/139 A, 178/7.6
[51] Int. Cl. ........................................... G01d 15/24
[58] Field of Search...... 346/139 A, 139 C; 178/7.6, 178/11

[56] References Cited
UNITED STATES PATENTS
2,129,483  9/1938  Van Deventer.................. 178/11
2,613,124  10/1952  Cooley et al.................. 346/139 A X
2,743,989  5/1956  Clurman et al............. 346/139 A X Primary Examiner—Joseph W. Hartary
Attorney, Agent, or Firm—Edward T. Connors

[57] ABSTRACT

A stylus block for use with a belt-type drive in which guiding means is applied against one side of the stylus block while a resilient guiding force is applied against the other side thereof so that the stylus block is guided in both directions on either side of the scanning line.

6 Claims, 2 Drawing Figures

PATENTED JAN 22 1974                                      3,787,889

3,787,889

FACSIMILE RECORDER WITH GUIDED STYLI

BACKGROUND OF THE INVENTION

This invention relates to facsimile recorders including a plurality of styli mounted on a belt, and more particularly to such a recorder with guided styli so that all of the styli are caused to move in the same scanning path.

Facsimile recording of copy is commonly effected on a continuous sheet of recording medium such as treated paper as it is advanced past a scanning line position. A plurality of electrical styli are spaced along an endless toothed belt traveling around pulleys so that the styli successively pass across the scanning line position to mark the recording sheet in accordance with received facsimile signals.

It is usual to mount a plurality of styli at equally spaced intervals on the belt rather than a single stylus in order that one stylus is in contact with the recording paper at almost all times during the rotation of the belt. The result of having a plurality of styli is that the copy is being almost continuously recorded.

Heretofore many recorder constructions have been provided including styli guidance structure. Among such constructions are those utilizing chains or flat strips of flexible metal as belts. Other constructions as here have utilized flexible toothed belts. The toothed belt, by reason of its extreme lateral flexibility, requires guiding means for the styli so that they will track in alignment across the scanning path.

Among the toothed belt constructions known to applicant is that shown in U.S. Pat. No. 3,683,412 issued to Edmund F. Priessnetz in which a pair of guide rails support the styli moving in a horizontal plane. In this construction the styli during the marking operation are held against the rails by the tension of the belt and gravity. A similar construction is shown in U.S. Pat. No. 3,164,435 issued to P.L. Grafstein et al.

SUMMARY OF THE INVENTION

The present invention aims to overcome the disadvantages of prior constructions by providing a facsimile recorder with guided styli so that good tracking of the styli is assured.

This is accomplished by providing a recorder structure in which the stylus block is guided in both directions on either side of the scanning line. This is achieved by utilizing simplified light weight components arranged in an unique manner. A guide rail applies a guiding force adjacent the tip of the stylus and another guide rail applies a force in the same direction at the opposite end of the stylus block. A balancing force is applied by a resilient guide rail located within the area traversed by the styli on the toothed side of the belt. This resilient guide rail bears against a cooperating surface carried by the stylus block. By this means the styli are caused to track the scanning line with no appreciable deviation between the paths of successive styli.

Other objects and advantages of the invention will be apparent from the following description and from the accompanying drawing which shows, by way of example, an embodiment of the invention.

DESCRIPTION OF THE PREFERRED EMBODIMENT

Figure 1:
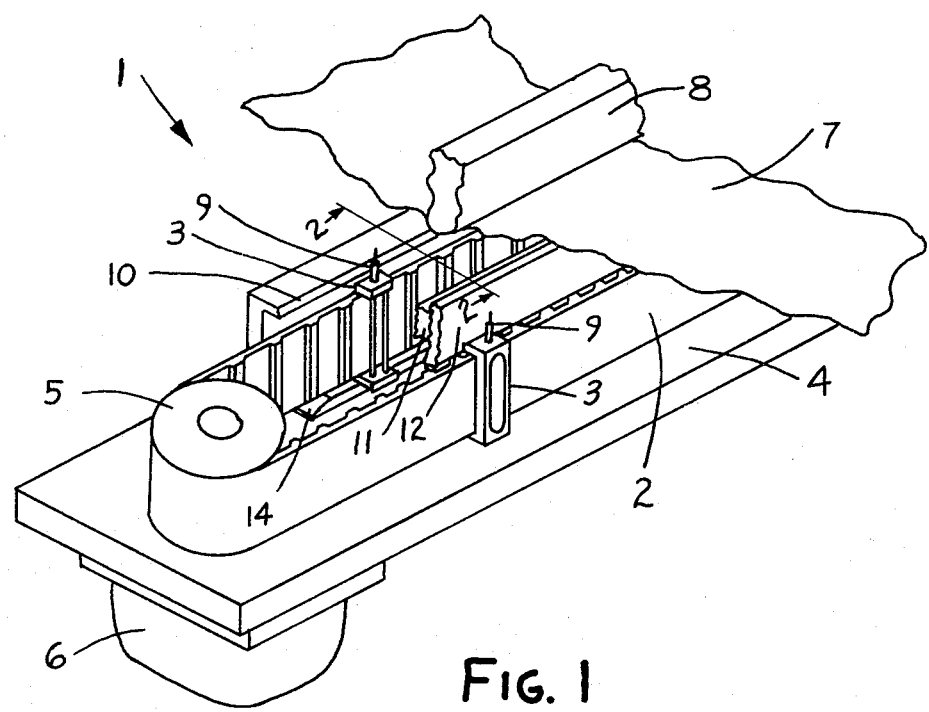
FIG. 1 is a perspective view of a portion of a facsimile recorder in accordance with the invention.

Referring to the drawings there is shown in FIG. 1 a portion of a facsimile recorder 1 utilizing a toothed belt 2 and incorporating a plurality of stylus assemblies 3 in accordance with the invention. The facsimile recorder 1 includes a supporting base 4 on which is carried a pair of pulleys 5 of which only one is shown. The pulleys 5 are adapted to be rotated by a motor 6. A sheet of recording medium or paper 7 is moved past a platen 8 by means well known in the art. The platen 8 backs a line of scan past which move the styli 9 carried in the stylus assemblies 3. Also carried by the supporting base 4 is a guide rail 10 adapted to contact the rear side of the styli 9. Another guiding member 11 is carried by a support 12 within the area traversed by the toothed belt 2. A stylus paper edge avoidance ramp member 14 is provided.

Figure 2:
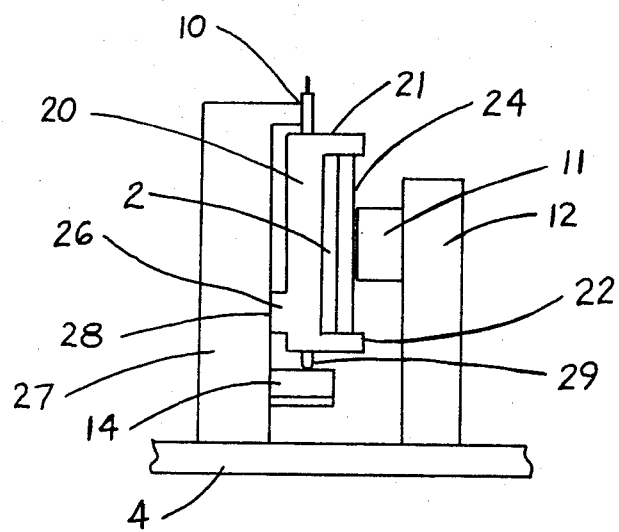
FIG. 2 is a schematic view taken generally along the line 2 — 2 of FIG. 1 and illustrates the areas at which guiding forces are applied to the stylus assemblies.

The stylus assembly 3 shown in FIG. 2 includes a base member 20 in contact with the back of the belt 2. A pair of flanges 21 and 22 of the base member 20 overlie the edges of the belt 2. The flanges 21 and 22 are apertured to receive pin members 24 frictionally engaged therein. The pin members 24 cooperate with the base member 20 in holding the stylus assembly 3 on the belt 2 and also provide a guided surface positioned on the front of the belt 2 beyond the tips of the belt teeth. The stylus mounting is claimed in our copending patent application Ser. No. 329,647 filed on even date herewith and titled Stylus Mounting for Belt Type Facsimile Recorders. The stylus assemblies 3 are claimed in our copending patent application Ser. No. 329,648 filed on even date herewith and titled Stylus Assemblies.

The stylus assembly 3 has a bearing surface formed on an extension 26 which engages with a surface defining a guide rail 28.

The stylus assembly 3 thus is guided on its back surface on the back of the belt 2 by the guide rails 10 and 28. The stylus assembly is urged against these guide rails by the action of the guiding member 11 against the pin 24 holding the stylus on the belt 2. The guiding member 11 is made of a resilient material such as polyester or polyurethane foam material over which is applied a flexible strip of low friction material such as Teflon. Thus the stylus assembly 3 is resiliently urged against the guide rails 10 and 28. Because of the resilient nature of the foam material no adjustments are required.

Electrical contact to the stylus assembly 3 may be made through either of the guide rails 10 and 28 or through a contact surface as indicated at 29 on the lower side of the stylus assembly 3.

While the invention has been described and illustrated with reference to a specific embodiment thereof, it will be understood that other embodiments may be resorted to without departing from the invention. Therefore, the form of the invention set out above should be considered as illustrative and not as limiting the scope of the following claims.

We claim:
1. A facsimile recorder comprising
a recorder frame,
means carried by said recorder frame for marking a record sheet by a plurality of moving stili,
said means including a driving means incorporating a toothed belt,
a plurality of stylus assemblies carried on said belt, each stylus assembly including
a stylus block having a portion thereof extending over a portion of the back of said belt,
a stylus,
supporting means for said stylus carried by said stylus block,
means defining a first guided surface carried by said stylus block and positioned on the front of said belt beyond the tip of at least one tooth thereof,
means defining a first guiding surface carried by said recorder frame in guiding relationship with said last mentioned means,
means defining a pair of guide rails carried by said recorder frame,
one of said guide rails in guiding relationship with said supporting means for said stylus,
and the other of said guiding rails in guiding relationship with said portion of said stylus block extending over the back of said belt, whereby each stylus is held in alignment and compelled to move in the same scanning path.

2. A facsimile recorder according to claim 1 in which said stylus block having a portion thereof extending over a portion of the back of said belt, and said means defining a first guiding surface include means for holding said belt therebetween.

3. A facsimile recorder according to claim 1 in which said means defining a first guiding surface carried by said recorder frame includes a resilient backing member, and a low friction surface member attached thereto provides said guiding surface.

4. A facsimile recorder according to claim 1 in which at least one of said pair of said means defining a pair of guiding surfaces provides electrical contact to said stylus block.

5. A facsimile recorder according to claim 1 in which said toothed belt is mounted in a horizontal plane.

6. A facsimile recorder according to claim 1 in which said styli supporting members extend in a vertical plane.

* * * * *